Feb. 8, 1927.  R. B. GILCHRIST  1,616,655
DRINK MIXER
Filed Dec. 18, 1922
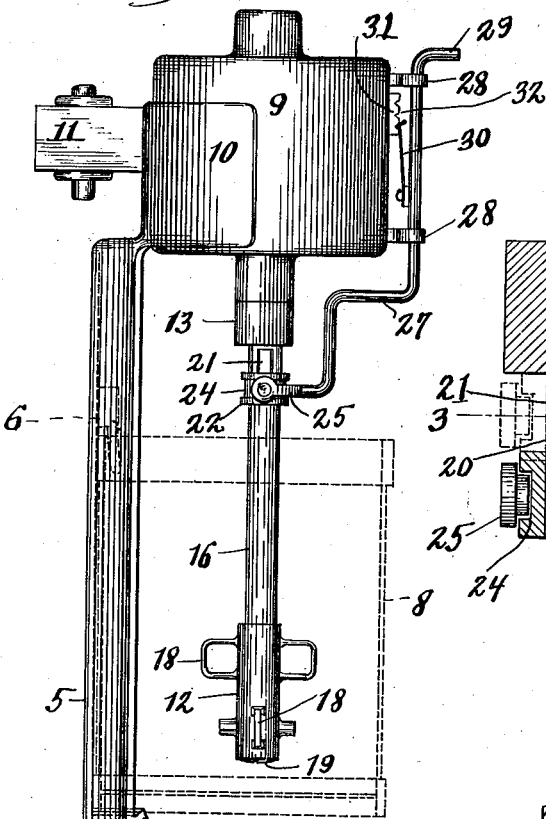
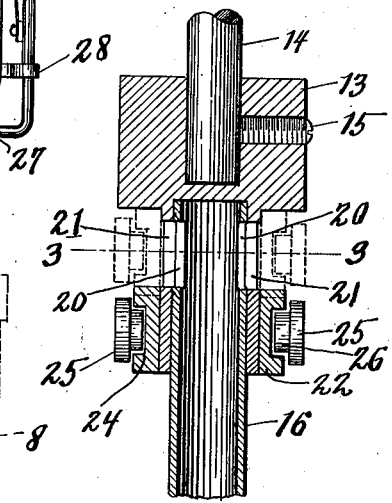
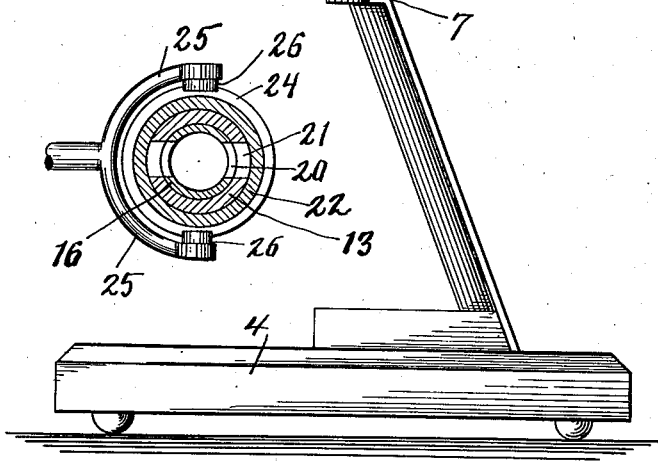
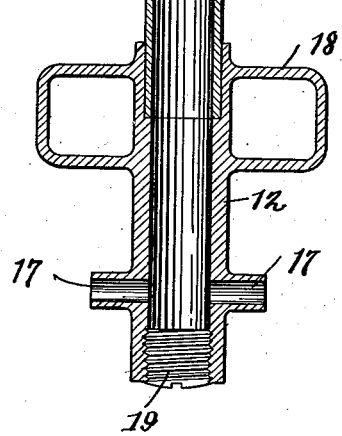
Inventor:
Raymond B. Gilchrist
By Fred Gerlach
his Attorney Patented Feb. 8, 1927.

1,616,655

UNITED STATES PATENT OFFICE.

RAYMOND B. GILCHRIST, OF NEWARK, NEW JERSEY, ASSIGNOR TO THE GILCHRIST COMPANY, OF NEWARK, NEW JERSEY, A CORPORATION OF NEW JERSEY.

DRINK MIXER.

Application filed December 18, 1922. Serial No. 607,473.

The invention relates to motor driven mixers which are designed to aerate liquids. Its objects are to provide a mixer which is regulable to vary the volume of air mixed with the materials; which may be used with or without the aerating device; and which may be readily adjustable to vary the volume of air for delivery to the mixer while the mixer is running.

The invention consist in the several novel features hereinafter set forth and more particularly defined by claims at the conclusion hereof.

In the drawings: Fig. 1 a side elevation of a mixer embodying the invention. Fig. 2 is a vertical longitudinal section of the mixing device. Fig. 3 is a section taken on line 3—3 of Fig. 2.

The invention is exemplified in a mixer comprising a base 4, a standard 5 suitably secured to the base and provided with any suitable means, such as a hook 6 and a ledge 7, for automatically and removably securing a receptacle 8, upon its manual placement into position in the hook and on the ledge, an electric motor 9 secured to the upper end 10 of standard 5, and a suitable switch 11 for controlling the operation of the motor.

A collar 13 is secured to the shaft 14 of the motor 9 by a set screw 15. A depending tube 16 is fixedly secured in the lower portion of said collar. A sleeve 12, provided with agitator loops or lugs 18, is fixedly secured to the lower end of tube 16. The lower portion of sleeve 12 is closed by a removable screw-plug 19 and above the plug, the sleeve is provided with outwardly extending discharge openings or nozzles 17. Openings 20 are formed in the upper end of tube 16 to admit air to the tube for discharge through openings 17 into the materials being mixed by the agitator. Tube 16 serves as a shaft for driving the agitator and as a duct for delivering air to the materials being mixed while the mixer is in operation. Openings 21 are formed in collar 13 in registry with openings 20 in the tube. A sleeve 22 is slidable on the lower portion of collar 13 and is adapted to be raised to completely close the inlet openings 21, 20, to partially open them, or to completely open them. An annular groove 24 is formed in the outer periphery of sleeve 22. A fork 25, having trunnions 26 extending into said groove, is adapted to raise and lower the sleeve 22, either while the sleeve and tube 16 are running or at rest. A rod 27 on the fork 25 is slidably guided in lugs 28 on the motor casing and is provided with a handle 29 whereby the sleeve 22 may be shifted. A resilient detent 30 is fixed to said rod and has a V-shaped terminal adapted to enter any of the notches 32 in a block 31 which is fixed to the motor casing to secure the rod in different positions.

At soda fountains and the like, drinks of many different kinds are called for. Some of these require more or less aeration and others do not require any. The present invention provides a motor driven mixer which is adapted for aeration and non-aeration drinks. For example, if the drink called for is one which requires or is improved by the introduction of a great volume of air, the operator will set the handle 29 in the positon shown in Fig. 1, so that the inlet openings will be completely open and the maximum volume of air will be drawn downwardly through the tube 16 and discharged through ducts 17 into the material while the motor is in operation. If less aeration or the introduction of a lesser volume of air is desired, the operator will lift the handle 29 into the intermediate notch 32 so that the inlet ports will be partially closed and, as a result, the supply of air to the materials will be restricted. If the mixer is to be used for a drink which does not require aeration, the operator will lift handle 29 to lock the detent 30 into the highest notch 32, so that the inlet openings will be completely closed and no aeration will result. The adjusting mechanism for the sleeve 22 may be shifted while the motor is in operation. This is an advantage, inasmuch as it permits the operator to check or increase the supply of air to the agitator, as he may find it desirable, from observation of the mixer while it is being agitated.

The invention exemplifies a motor driven mixer in which provision is made for the introduction of air into the material being mixed; in which the quantity may be regulated as desired; and in which provision is made for effecting this regulation while the agitator is running. The screw 19 is removable from the lower end of the sleeve 12 so that the tube 16 and sleeve can be easily cleansed and kept in a sanitary condition.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a drink mixer, the combination of an electric motor, a tubular shaft connected to and depending from the rotor of said motor, said shaft being provided with an air inlet at its upper end and an air outlet at its lower end, an agitator on the lower end of the shaft, a sleeve slidably mounted around the upper end of the shaft for opening and closing the inlet to control the flow of air through the shaft, and means mounted independently of the shaft for adjusting said sleeve while the shaft is rotating at a high speed.

2. In a drink mixer, the combination of an electric motor, a tubular shaft connected to and depending from the rotor of said motor, said shaft being provided with an air inlet at its upper end and an air outlet at its lower end, an agitator on the lower end of the shaft, a sleeve slidably mounted around the upper end of the shaft for opening and closing the inlet to control the flow of air through the shaft, said sleeve being provided with an annular groove, and a slidably mounted member provided with means extending into said groove, said member being adapted to be shifted while the shaft is rotating at a high speed to adjust said sleeve.

3. In a drink mixer, the combination of an electric motor comprising a rotor and a casing, a tubular shaft connected to and depending from the rotor, said shaft being provided with an air inlet at its upper end and an air outlet at its lower end, an agitator on the lower end of the shaft, a sleeve slidably mounted around the upper end of the shaft for opening and closing the inlet to control the flow of air through the shaft, and means slidably mounted on the motor casing for adjusting the sleeve while the shaft is rotating at a high speed.

In testimony whereof I affix my signature.

Signed at Newark, New Jersey, this 24th day of November, 1922.

RAYMOND B. GILCHRIST.